Figure 1:
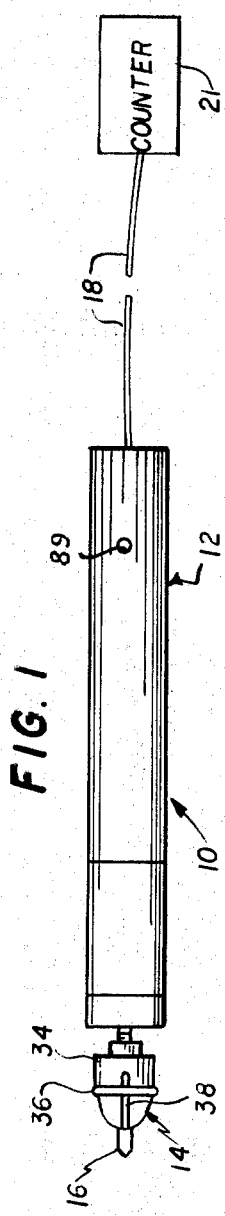

United States Patent

Stumpo

[11] 3,792,240
[45] Feb. 12, 1974

[54] PROBE AND MARKER ASSEMBLY

[76] Inventor: Gregory G. Stumpo, 5516 W. Higgins Rd., Chicago, Ill. 60630

[22] Filed: June 26, 1972

[21] Appl. No.: 266,136

[52] U.S. Cl... 235/92 PC, 235/92 R, 340/146.3 SY, 235/92 PK
[51] Int. Cl. .......................................... G06m 11/00
[58] Field of Search ....... 235/92 MS, 92 PC, 92 PK; 340/146.3 SY; 346/139; 178/18–20

[56] References Cited
UNITED STATES PATENTS

| | | | |
|---|---|---|---|
| 3,462,548 | 8/1969 | Rinder | 340/146.3 SY |
| 3,145,367 | 8/1964 | Crane | 340/146.3 SY |
| 2,120,172 | 6/1938 | Burnett et al. | 235/92 PK |
| 2,511,202 | 6/1950 | Fulboam | 235/92 PC |
| 3,344,259 | 9/1967 | Degelman | 235/92 PC |
| 3,393,299 | 7/1968 | Baker | 235/92 MS |

Primary Examiner—Paul J. Henon
Assistant Examiner—Joseph M. Thesz
Attorney, Agent, or Firm—Bernard L. Kleinke; Leonard J. Kalinowski

[57] ABSTRACT

An assembly adapted to mark a surface to be examined and adapted to cause a counter to be advanced when a mark is made on the surface, includes a rod extending at least partially within a tubular housing in axial alignment therewith and rockably mounted intermediate its ends near the front end of the housing, a marking device connected to the front end of the rod and extending from the front end of the housing, a first electrical contact fixedly mounted within the housing near the rear end portion thereof, a second electrical contact mounted on the rear end portion of the rod in axial alignment with the housing spaced from the first contact to engage it when the marking device engages the surface to cause the rod to rock, a coil spring surrounding the intermediate portion of the rod near its rear end portion spaced rearwardly from its rockable connection with the housing to urge the rod resiliently into axial alignment with the housing, the spring having a cylindrical helical portion engaging the inner surface of the housing substantially throughout the length of the helical portion and having an end portion attached to the rod, and first and second electrical connectors for supplying an electrical advance signal to the counter for advancing it, the first conductor being connected electrically to the housing and the second connector being electrically connected to the second contact, the rod, the housing, and the rockable connection being electrically conductive and the rod being connected electrically to the second contact.

5 Claims, 2 Drawing Figures

PATENTED FEB 12 1974  3,792,240

PROBE AND MARKER ASSEMBLY

The present invention relates to a probe and marker assembly, and it more particularly relates to a probe and marker assembly adapted to mark a surface to be examined and adapted to cause a counter to be advanced each time a mark is made on the surface.

For the purpose of counting bacteria in a culture, the culture contained in a sealed transparent glass container is observed through a magnifying glass. In order to facilitate the counting of the bacteria and to assure that an accurate count is made, a probe and marker assembly has been used by the personnel taking the count. In this regard the assembly which is of a similar size and shape as a conventional pencil is used to mark the surface of the glass container during the counting operation, and the marker end of the assembly is connected to a rod or reed, which is composed of an electrically conductive material and which is disposed within the tubular housing of the assembly, whereby when a mark is placed on the glass container, the rod flexes into electrical engagement with the metallic housing to cause an electrical signal to be generated and supplied to a counter for advancing it each time a mark is made on the glass surface. However, such an assembly has not been entirely satisfactory in that electrical contact was not always made between the rod and the housing for each mark made on the glass container. In this regard, the cantilevered rod extending axially within the tubular housing has not made the electrical contact with the housing when the operator fails to supply sufficient pressure on the marker end of the assembly during a marking operation. Thus, such an assembly has not been able to accommodate different writing pressures applied by different operators. Therefore, it would be highly desirable to have a probe and marker assembly, which would accommodate various different marking pressures to provide an accurate count.

Therefore, the principal object of the present invention is to provide a new and improved probe and marker assembly, which causes a counter to be advanced for each mark placed on a surface to be examined in an accurate manner, which assembly is efficient in operation and inexpensive to manufacture.

Another object of the present invention is to provide such a new and improved probe and marker assembly which can accommodate various different marking pressures, and which can accommodate a marking pressure applied during a marking operation at any angle of contact between the marking end of the assembly and the surface to be examined.

Briefly, the above and further objects of the present invention may be realized by providing a probe and marker assembly, which includes a rod rockably mounted within a tubular housing, a marking device connected to one end of the rod extending from the front end portion of the housing, a first electrical contact fixedly mounted within the housing near the rear end portion thereof, a second electrical contact mounted at the rear end portion of the rod in axial alignment with the housing to engage the first contact when the marking device engages the surface to be examined to cause the rod to rock, a coil spring surrounding the intermediate portion of the rod near its rear end portion spaced rearwardly from its rockable connection with the housing to urge the rod resiliently into axial alignment with the housing, and first and second electrical conductors for supplying an electrical advance signal to the counter for advancing it, the first conductor being connected electrically to the housing and the second conductor being electrically connected to the second contact, the rod, the housing, and the rockable connection being electrically conductive and the rod being connected electrically to the second contact. The spring has a cylindrical helical portion engaging the inner surface of the housing substantially throughout the length of the helical portion and has an end portion attached to the rod, whereby the cylindrical helical portion of the spring engages the inner surface of the housing continuously throughout a 360° line of interengagement therebetween so that the coil exerts a uniformly distributed tension on the rod and thus the rod is maintained in its centered position relative to the housing regardless of the direction of the marking pressure applied to the rod via the marking device at the front end thereof. The intermediate portion of the rod is externally threaded, and the end portion of the spring attached to the rod is cylindrically helical in shape to threadably engage the intermediate portion of the rod so that the spring can be moved axially relative to the rod, whereby the biasing tension of the spring acting on the rod can be adjusted to accommodate various different marking pressures for a given operator. In order to further stabilize the rod and to further evenly distribute the tension of the spring acting on the rod, the spring includes an intermediate portion of a spirally helical shape.

Figure 2:
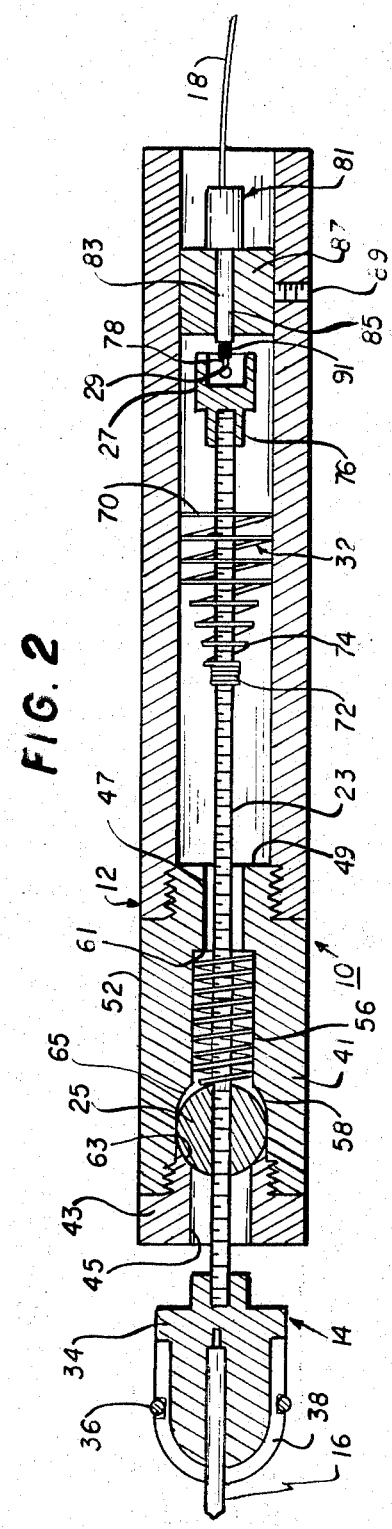

The above and other objects and features of this invention can be understood with reference to the drawings, wherein:

FIG. 1 is a fragmentary elevational view of a probe and marker assembly, which is constructed in accordance with the present invention to advance a counter shown schematically; and FIG. 2 is a vertical cross-sectional enlarged view of the assembly of FIG. 1.

Referring now to the drawings, and more particularly to FIG. 1 thereof, there is shown a probe and marker assembly 10, which is constructed in accordance with the present invention. The assembly 10 includes a tubular housing 12 which is similar in size and shape to a conventional pencil and thus is adapted to be conveniently held in the hand of the user, a marking device 14 extending from the front end portion of the housing 12 and having a marking stick 16 composed of suitable material to apply a mark on the surface to be inspected, and a cable 18 extending from the rear end portion of the housing 12 to a counter 21. In use, the assembly 10 is held in the hand of the user and a mark is made on a surface to be examined by means of the marking stick 16, and in so doing, as hereinafter described in greater detail an electrical signal is supplied from the assembly 10 via its cable 18 to the counter 21. As a result, the counter 21 is advanced each time a mark is made on the surface to be examined. It should be understood that the assembly 10 may be used for counting bacteria in a culture confined within a transparent glass container, but the assembly 10 may also be used for counting other types and kinds of objects where a mark is placed on a surface to insure an accurate count.

Considering now the assembly 10 in greater detail with reference to FIG. 2 of the drawings, the assembly 10 generally comprises an externally threaded rod 23 disposed within the tubular housing 12 axially aligned therewith, a centrally apertured, internally threaded ball 25 threaded onto the rod 23 within the housing 12 near the front end thereof to rockably mount the rod 23 within the housing 12, a female electrical contact 27 threaded onto the rear end portion of the rod 23 to engage a male contact 29 fixedly mounted within the housing at the rear end portion thereof, and a coil spring 32 surrounding an intermediate portion of the rod 23 within the housing 12 to resiliently urge the rod 23 into axial alignment with the housing 12. The marker device 14 is threaded onto a front end portion of the rod 23 extending from the housing 12 so that when the marker device 14 is pressed into contact with a surface to be examined, the rod 23 rocks end to end from axial alignment relative to the housing 12 and thus the female contact 27 moves into engagement with the male contact 29 to complete an electrical circuit for advancing the counter 21 as hereinafter described in greater detail. After the pressure is released from the marker device 14 upon completion of marking the surface, the spring 32 causes the rod 23 to snap back to its normal centered position relative to the housing 12.

Considering now the assembly 12 in still greater detail, the marker device 14 comprises a collet 34 for receiving the marking stick 16 and includes an O-ring 36 disposed within an external peripheral groove for maintaining the collet 34 in a closed gripping position about the marking stick 16. The collet 34 includes four axially-extending equally-spaced slits, such as the slit 38 (FIG. 1) to form jaws to grip the marking stick 16. In order to replace the marking stick 16 the O-ring 36 is slipped off of the front end of the collet 34 and then the used stick may be removed so that a fresh stick may be inserted therein, the O-ring 36 is being then slipped into its groove.

The ball 25 fits within an intermediate portion 41 of the housing 12 and is retained therein by a retainer 43 forming the front end portion of the housing 12 and threaded into the intermediate portion 41 thereof. The rod 23 extends through a large axially-aligned hole 45 in the retainer portion 43 and through a somewhat smaller hole 47 in a neck portion 49 at the rear end portion of the intermediate housing member 41, the neck portion 49 being threaded into the elongated rear end portion 52 of the housing 12. A coil spring 54 surrounds the rod 23 and is disposed within an intermediate chamber 56 within the portion 41 of the housing 12 communicating between the hole 47 and the chamber 58 in the front portion of the housing portion 41 containing the ball 25, the spring 54 being seated against a shoulder 61 and urging the ball 25 against a socket 63 of the retainer 43. As a result, if the marker device 14 moves axially without any lateral displacement during a marking operation, the rod 23 and the ball 25 retract rearwardly against the force of the spring 54. The rod 23 continues to move rearwardly until the female contact 27 engages the male contact 29 to generate the advance signal, and also the ball 25 is limited in its rearward movement by an internal rear shoulder 65 of the housing portion 41. Thereafter, when the marking pressure is released from the marker device 14, the spring 54 pushes the ball 25 forwardly until it engages the socket 63. It should be understood that the ball 25 serves as a universal connection between the rod 23 and the housing 12 so that the rod 23 and the marker device 14 can move universally.

The coil spring 32 includes a cylindrical helical portion 70 engaging the inner surface of the housing substantially throughout the length of the helical cylindrical portion 70 to provide a continuous helical line of interengagement between the helical portion 70 and the inner surface of the housing portion 52 throughout a 360° path, so that a uniformly applied tension is acted upon the rod 23. An end portion 72 of the spring 32 is cylindrically helical in shape and is of a diameter to threadably receive the rod 23, which is externally threaded throughout its entire length. The pitch of the loops of wire forming the portion 72 is designed to mate with the externally threaded portion of the rod 23, whereby the spring acting on the rod can be adjusted to adapt the movement of the rod to various different marking pressures applied to the marker device 14 for a given user. Accordingly, the spring 32 may be moved toward or away from the female contact 27 for the purpose of adjusting the spring tension acting on the rod 23. An intermediate portion 74 of the spring 32 is of a spirally helical shape to further cause a uniform distribution of tension on the rod 23.

The female contact 27 is generally cup-shaped to loosely receive the male contact 29 and includes a forwardly extending internally threaded stud portion 76 threaded onto the rear end portion of the rod 23 so that the spacing between the female contact 27 and the male contact 29 may be adjusted. The male contact 29 is the end portion of an inner conductor 78 of a coaxial contact element 81, which includes an outer conductor 83 mounted within an axially aligned hole 85 in a block 87 mounted within the housing portion 52 and held in place by a set screw 89. An insulator 91 electrically isolates the inner and outer conductors. It should be understood that the inner conductor 78 and the outer conductor 83 are electrically connected to a pair of wires (not shown) which extend rearwardly from the assembly 12 within the cable 18. The block 87, the housing 12, the ball 25, the rod 23, and the female contact 27 are all composed of electrically conductive material so that when the contacts 27 and 29 engage, an electrical circuit is connected from the inner conductor 78, the male contact element 29, the female contact element 27, the rod 23, the ball 25, the housing 12, the block 87 and the outer conductor 83.

While the present invention has been described in connection with a particular embodiment thereof, it will be understood that those skilled in the art may make many changes and modifications without departing from the invention. Accordingly, it is intended by the appended claims to cover all such changes and modifications as fall within the true spirit and scope of this invention.

What is claimed is:

1. An assembly adapted to mark a surface to be examined and adapted to cause a counter to be advanced when a mark is made on the surface, comprising:
   a tubular housing;
   a rod extending at least partially within said housing in axial alignment therewith;
   means rockably mounting said rod intermediate its ends near the front ends of said housing to said housing;
   marking means extending from the front end portion of said housing and connected to the front end portion of said rod, said marking means being adapted to mark the surface;

first electrical contact means fixedly mounted within said housing near the rear end portion thereof;

second electrical contact means mounted on the rear end portion of said rod in axial alignment with said housing spaced from said first contact means to engage said first contact means when said marking means engages the surface to cause said rod to move;

a coil spring surrounding an intermediate portion of said rod near its rear end portion spaced rearwardly from its rockable connection with said housing to urge said rod resiliently into axial alignment with said housing, said spring having a cylindrical helical portion engaging the inner surface of said housing substantially throughout the length of said helical portion and not having an end portion attached to said rod, said intermediate portion of said rod being externally threaded, said end portion of said spring attached to said rod being cylindrically helical in shape to threadably engage said intermediate portion of said rod so that said spring can be positionally adjusted axially relative to said rod to enable the adjustment of the biasing tension of said spring acting on said rod; and first and second electrical conductors for supplying an electrical advance signal to the counter for advancing it, said first conductor being connected electrically to said housing and said second conductor being electrically connected to said second contact means, said rod, said housing, and said means rockably mounting said rod being electrically conductive, said rod being connected electrically to said second contact means.

2. An assembly according to claim 1, wherein said spring includes an intermediate portion of a spirally helical shape.

3. An assembly according to claim 2, wherein said second contact means is threadably connected to said rod to enable it to be moved axially relative to said rod so that the relative position between said first contact means and said second contact means may be adjusted.

4. An assembly adapted to mark a surface to be examined and adapted to cause a counter to be advanced when a mark is made on the surface comprising:

a tubular housing;

a rod extending at least partially within said housing in axial alignment therewith;

means rockably mounting said rod intermediate its ends near the front end of said housing to said housing;

marking means extending from the front end portion of said housing and connected to the front end portion of said rod, said marking means being adapted to mark the surface;

first electrical contact means fixedly mounted within said housing near the rear end portion thereof;

second electrical contact means mounted on the rear end portion of said rod in axial alignment with said housing spaced from said first contact means to engage said first contact means when said marking means engages the surface to cause said rod to move;

a coil spring surrounding an intermediate portion of said rod near its rear end portion spaced rearwardly from its rockable connection with said housing to urge said rod resiliently into axial alignment with said housing, said spring having a cylindrical helical portion engaging the inner surface of said housing substantially throughout the length of said helical portion and having an end portion attached to said rod; and first and second electrical conductors for supplying an electrical advance signal to the counter for advancing it, said first conductor being connected electrically to said housing and said second conductor being electrically connected to said second contact means, said rod, said housing, and said means rockably mounting said rod being electrically conductive, said rod being connected electrically to said second contact means, said intermediate portion of said rod being externally threaded, said end portion of said spring attached to said rod being cylindrically helical in shape to threadably engage said intermediate portion of said rod so that said spring can be moved axially relative to said rod to enable the adjustment of the biasing tension of said spring acting on said rod, said spring including an intermediate portion of a spirally helical shape, said second contact means being threadably connected to said rod to enable it to be moved axially relative to said rod so that the relative position between said first contact means and said second contact means may be adjusted, said first contact menas comprising a male contact element, said second contact means comprising a female contact element, said female contact element being cup-shaped with its open mouth loosely receiving said male element therewithin in a spaced-apart relationship.

5. An assembly according to claim 4, wherein said means rockably mounting said rod includes a ball having a diametrically extending internally threaded hole disposed therethrough for receiving and engaging threadably an externally threaded intermediate portion of said rod, said housing having an internal socket portion for engaging said ball, a second spring being mounted within said housing for urging resiliently said ball forwardly into engagement with said socket portion so that axial movement of said marking means relative to said housing causes said rod to move a rearward direction axially against the force of said second spring to in turn cause said second contact means to engage said first contact means, whereby said second spring causes said ball and thus said rod to return forwardly until said ball engages said socket portion when the force causing the rearwardly directed axial movement of said marking means is removed.

* * * * *